United States Patent
Tao et al.

(10) Patent No.: US 8,831,845 B1
(45) Date of Patent: Sep. 9, 2014

(54) METHOD OF LEARNING ENGAGED POSITIONS AND A NEUTRAL POSITION OF A SYNCHRONIZER ACTUATOR FORK OF A DUAL CLUTCH TRANSMISSION

(71) Applicant: GM Global Technology Operations LLC, Detroit, MI (US)

(72) Inventors: Xuefeng Tim Tao, Northville, MI (US); Matthew Kempeinen, Pinckney, MI (US); Christopher Jay Weingartz, Holly, MI (US); Jeryl McIver, Inkster, MI (US); David H Vu, East Lansing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/870,030

(22) Filed: Apr. 25, 2013

(51) Int. Cl.
| | |
|---|---|
| *F16H 61/00* | (2006.01) |
| *F16H 61/02* | (2006.01) |
| *F16H 61/30* | (2006.01) |
| *B60W 10/10* | (2012.01) |
| *B60W 30/19* | (2012.01) |

(52) U.S. Cl.
CPC .......... *F16H 61/0204* (2013.01); *F16H 61/30* (2013.01); *B60W 10/10* (2013.01); *B60W 30/19* (2013.01)
USPC ............................................. 701/60; 701/58

(58) Field of Classification Search
CPC ......... F16H 61/00; F16H 61/26; F16H 61/30; F16H 61/02; F16H 61/0204; F16H 61/009; F16H 3/083; F16H 3/08; F16H 47/00; B60W 10/02; B60W 10/10; B60W 10/11; B60W 30/19
USPC ................. 701/51, 55, 56, 58, 59, 60, 61, 67; 74/325, 329, 331, 473.1; 474/73, 331; 475/207; 192/3.54–3.58
See application file for complete search history.

(56) References Cited

U.S. PATENT DOCUMENTS

| | | | |
|---|---|---|---|
| 2012/0145503 A1* | 6/2012 | Moorman et al. | 192/3.58 |
| 2013/0139646 A1* | 6/2013 | Olson et al. | 74/730.1 |
| 2013/0184945 A1* | 7/2013 | Tumavitch et al. | 701/51 |
| 2013/0237352 A1* | 9/2013 | Braford, Jr. | 474/73 |
| 2013/0291670 A1* | 11/2013 | Baldwin | 74/329 |
| 2014/0007727 A1* | 1/2014 | Weingartz et al. | 74/473.11 |

* cited by examiner

*Primary Examiner* — Richard Camby
(74) *Attorney, Agent, or Firm* — Quinn Law Group, PLLC

(57) ABSTRACT

A method of controlling a dual clutch transmission includes repeatedly moving a synchronizer into interlocking engagement with a first gear with an actuator fork, and repeatedly sensing a position of the actuator fork for each occurrence that the actuator fork moves the synchronizer into the interlocking engagement with the first gear. The sensed positions of the actuator fork are averaged to define a first engaged position of the actuator fork for engaging the first gear. A second engaged position at which the actuator fork couples the synchronizer to a second gear may be determined in the same manner. A neutral position may be determined by identifying the axial locations of peak acceleration of the actuator fork while moving between the first engaged position and the second engaged position. The identified axial locations are averaged to define the neutral position of the actuator fork.

20 Claims, 2 Drawing Sheets

METHOD OF LEARNING ENGAGED POSITIONS AND A NEUTRAL POSITION OF A SYNCHRONIZER ACTUATOR FORK OF A DUAL CLUTCH TRANSMISSION

TECHNICAL FIELD

The invention generally relates to a method of controlling a dual clutch transmission, and more specifically to a method of learning neutral and engagement positions of a synchronizer actuator fork of the dual clutch transmission.

BACKGROUND

Dual clutch transmissions include a plurality of synchronizers. Each synchronizer moves along a layshaft into and out of interlocking engagement with at least one, and often two different gears to rotatably couple one of the gears to the layshaft. Each synchronizer includes a synchronizer actuator fork that moves the synchronizer axially along the layshaft. A transmission control module must know a position of the synchronizer actuator fork when the synchronizer engages each of the different gears, as well as a neutral position of the synchronizer actuator fork when the synchronizer is not engaged with any of the different gears, in order to properly control the operation of the dual clutch transmission.

SUMMARY

A method of controlling a dual clutch transmission. The method includes repeatedly moving a synchronizer into interlocking engagement with a first gear with a synchronizer actuator fork to rotatably couple the first gear to a layshaft. A position of the synchronizer actuator fork is repeatedly sensed for each occurrence that the synchronizer actuator fork moves the synchronizer into the interlocking engagement with the first gear. The sensed positions of the synchronizer actuator fork that were sensed for each occurrence of the synchronizer actuator fork moving the synchronizer into the interlocking engagement with the first gear are averaged to define a first engaged position of the synchronizer actuator fork for engaging the first gear. The actuation of the dry dual clutch transmission is controlled based on the first engaged position of the synchronizer actuator fork.

A method of learning neutral and engaged positions of a synchronizer actuator fork that is operable to move a synchronizer into interlocking engagement with either a first gear and a layshaft, or a second gear and the layshaft is also provided. The method includes applying a pressure force to an actuator of the synchronizer actuator fork to move the synchronizer actuator fork in a first direction along a longitudinal axis of the layshaft. Movement of the synchronizer actuator fork in the first direction moves the synchronizer into interlocking engagement with the first gear to rotatably couple the first gear and the layshaft. The pressure force applied to the actuator is released after the synchronizer actuator fork has moved the synchronizer into interlocking engagement with the first gear. A first location of the synchronizer actuator fork along the longitudinal axis of the layshaft is sensed after the pressure force that was applied to the actuator to move the synchronizer actuator fork into interlocking engagement with the first gear has been released, and the pressure force has dropped to zero KPa. The sensed first location of the synchronizer actuator fork is defined as a first engaged position of the synchronizer actuator fork. A pressure force is applied to the actuator of the synchronizer actuator fork to move the synchronizer actuator fork in a second direction along a longitudinal axis of the layshaft, opposite the first direction. Movement of the synchronizer actuator fork in the second direction moves the synchronizer into interlocking engagement with the second gear to rotatably couple the second gear and the layshaft. The pressure force applied to the actuator is released after the synchronizer actuator fork has moved the synchronizer into interlocking engagement with the second gear. A second location of the synchronizer actuator fork along the longitudinal axis of the layshaft is sensed after the pressure force that was applied to the actuator to move the synchronizer actuator fork into interlocking engagement with the second gear has been released and the pressure force has dropped to zero KPa. The sensed second location of the synchronizer actuator fork is defined as a second engaged position of the synchronizer actuator fork.

Accordingly, the engaged positions of the synchronizer actuator fork may be learned as part of a test cycle, in which the synchronizer actuator fork is intentionally moved to couple the first gear and the second gear to the layshaft, or during actual operation, in which a control module monitors the movement and position of the synchronizer actuator fork during actual driving conditions. The control module may use the learned positions of the synchronizer actuator fork to more accurately control the operation of the transmission.

A neutral position of the synchronizer actuator fork may also be learned during the above described process of learning the engaged positions of the synchronizer actuator fork. In order to learn the neutral position of the synchronizer actuator fork, the acceleration of the synchronizer actuator fork in the first direction is sensed as the synchronizer actuator fork moves between the second engaged position and the first engaged position. A first axial location along the longitudinal axis of the layshaft corresponding to a peak acceleration of the synchronizer actuator fork in the first direction is identified. The acceleration of the synchronizer actuator fork in the second direction is sensed as the synchronizer actuator fork moves between the first engaged position and the second engaged position. A second axial location along the longitudinal axis of the layshaft corresponding to a peak acceleration of the synchronizer actuator fork in the second direction is identified. The first axial location and the second axial location are averaged to calculate a neutral position of the synchronizer actuator fork, between the first engaged position and the second engaged position. This process may be repeated to improve the accuracy of the calculated neutral position. Similar to the engaged positions of the synchronizer actuator fork, the control module may use the calculated neutral position to more accurately control the operation of the transmission The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
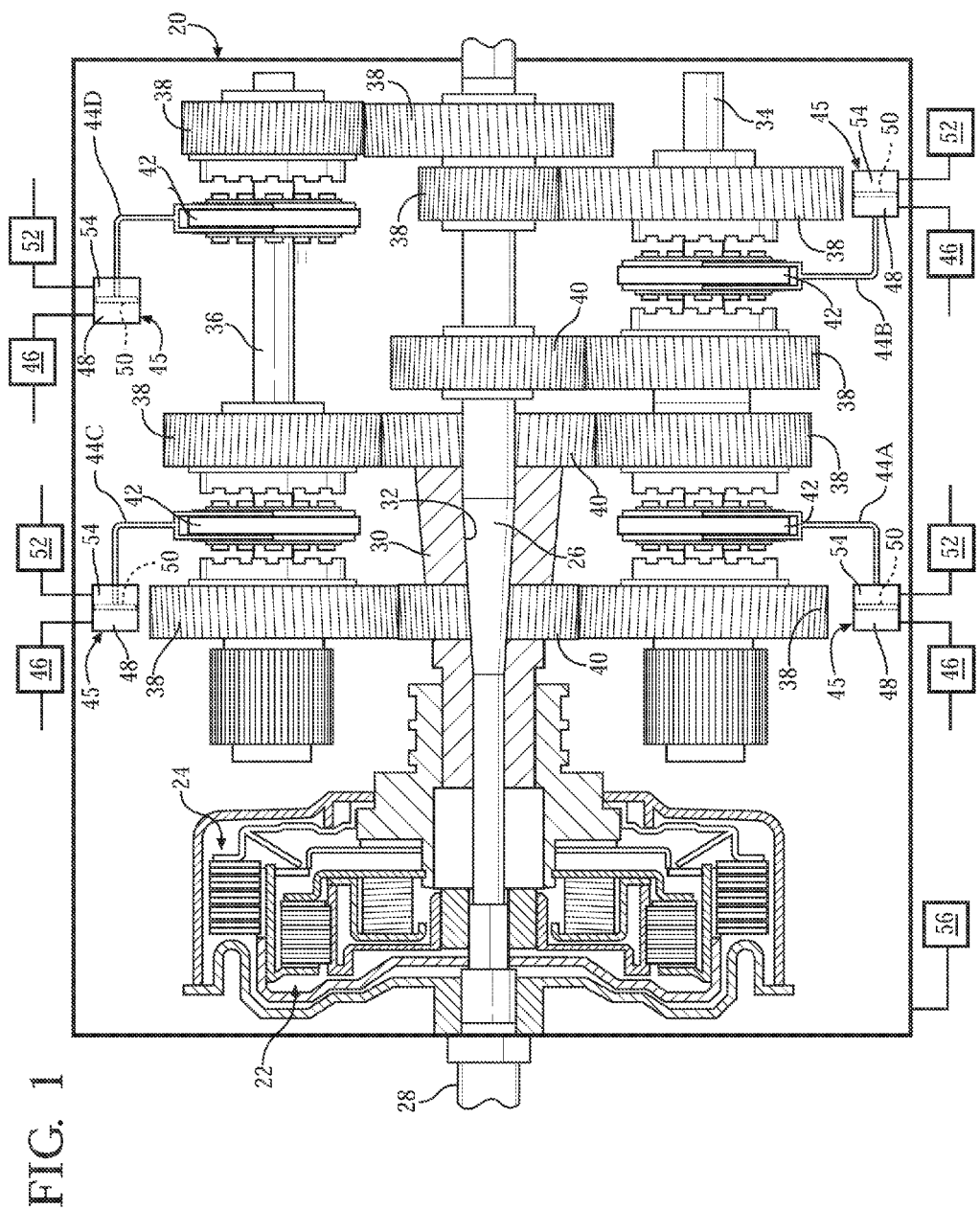
FIG. 1 is a schematic plan view of a dry dual clutch transmission.

Referring to the Figures, wherein like numerals indicate like parts throughout the several views, a transmission, hereinafter referred to as a dual clutch transmission, is generally shown at 20 in FIG. 1. While the invention is described relative to the exemplary dual clutch transmission 20 shown in FIG. 1, it should be appreciated that the invention may be utilized with other styles of transmission, not shown or described herein. The dual clutch transmission 20 includes a first clutch 22 and a second clutch 24. The first clutch 22 is coupled to a first transmission shaft 26, and selectively connects the first transmission shaft 26 to an output 28 of an engine (not shown). e.g., a crankshaft. The second clutch 24 is coupled to a second transmission shaft 30, and selectively connects the second transmission shaft 30 to the output 28 of the engine. The first clutch 22 and the second clutch 24 may include, for example, but are not limited to, a wet clutch or a dry clutch. When engaged, the first clutch 22 interconnects the first transmission shaft 26 with the output 28 of the engine to continuously transmit torque therebetween. When disengaged, the first clutch 22 disconnects the first transmission shaft 26 from the output 28 of the engine to disallow torque transmission therebetween. Similarly, when the second clutch 24 is engaged, the second clutch 24 interconnects the second transmission shaft 30 with the output 28 of the engine to continuously transmit torque therebetween. When disengaged, the second clutch 24 disconnects the first transmission shaft 26 from the output 28 of the engine to disallow torque transmission therebetween.

The first transmission shaft 26 may include either an inner transmission shaft or an outer transmission shaft, and the second transmission shaft 30 includes the other of the inner transmission shaft and the outer transmission shaft. The outer transmission shaft defines a hollow core 32, with the inner transmission shaft disposed therein and concentric with the outer transmission shaft as is known with dual clutch transmissions. FIG. 1 shows the first transmission shaft 26 as the inner transmission shaft, and the second transmission shaft 30 as the outer transmission shaft. However, it should be appreciated that the first transmission shaft 26 may alternatively be defined as the outer transmission shaft and the second transmission shaft 30 may be defined as the inner transmission shaft.

The dual clutch transmission 20 includes at least one layshaft. As shown, the dual clutch transmission 20 includes a first layshaft 34 and a second layshaft 36. However, it should be appreciated that the dual clutch transmission 20 need only include one layshaft. Each of the first layshaft 34 and the second layshaft 36 include a plurality of layshaft gears 38 rotatably supported thereon, and in meshing engagement with one of a plurality of transmission shaft gears 40 disposed on one of the first transmission shaft 26 or the second transmission shaft 30.

The dual clutch transmission 20 further includes a plurality of synchronizers 42. Each of the synchronizers 42 rotatably couples at least one of the layshaft gears 38 to one of the first layshaft 34 or the second layshaft 36 for torque transmitting rotation therewith. A shift mechanism, hereinafter referred to as a synchronizer actuator fork 44, moves each of the synchronizers 42 into engagement with one of the layshaft gears 38. The dual clutch transmission 20 includes multiple synchronizer actuator forks 44 to move the various synchronizers 42 into and out of engagement. The synchronizer actuator forks 44 are referred to collectively within the written description by the reference numeral 44, and are shown in the Figures and referred to individually by reference numerals 44A, 44B, 44C, and 44D. The movement of each of the synchronizer actuator forks 44 is controlled by an actuator 45. The actuator 45 includes a pressure solenoid 46, which applies fluid pressure to a first side 48 of an actuator piston 50, and a flow solenoid 52 disposed in series with the pressure solenoid 46, which controls fluid flow from a second side 54 of the actuator piston 50.

The dual clutch transmission 20 may include a control module 56, such as but not limited to a transmission control unit, to control the operation of the dual clutch transmission 20. The control module 56 may include a computer and/or processor, and include all software, hardware, memory, algorithms, connections, sensors, etc., necessary to manage and control the operation of the dual clutch transmission 20. As such, a method of controlling the dual clutch transmission 20, and more specifically a method of learning a neutral position and engaged positions of the synchronizer actuator forks 44 may be embodied as a program operable on the control module 56. It should be appreciated that the control module 56 may include any device capable of analyzing data from various sensors, comparing data, making the necessary decisions required to control the operation of the dual clutch transmission 20, and executing the required tasks necessary to control the operation of the dual clutch transmission 20.

In order to get fast responding, smooth operation from the dual clutch transmission 20, the movement of the synchronizers 42 must be consistent and predictable. Accordingly, the method of learning the neutral position and the engaged positions of the synchronizer actuator forks 44 described below provides the control module 56 with the positional information required to provide consistent and predictable movement of the synchronizers 42 to ensure quick, smooth shifts.

The method includes providing the control module 56, which is operable to control the dual clutch transmission 20, including controlling the movement of the synchronizer actuator fork 44, sense the position of the synchronizer actuator fork 44, and sense the acceleration of the synchronizer actuator fork 44. As noted above, the control module 56 includes all software, hardware, memory, algorithms, connections, sensors, etc. necessary to manage and control the operation of the dual clutch transmission 20. The control module 56 is operable to perform the various tasks of the method described below.

Figure 2:
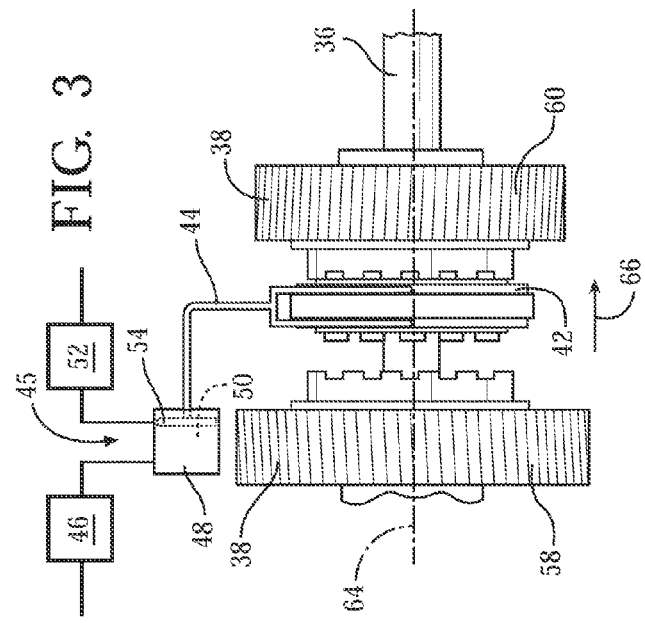
FIG. 2 is an enlarged fragmentary schematic plan view of the dry dual clutch transmission showing a synchronizer actuator fork in a first engaged position for coupling a first gear to a layshaft.
Figure 3:
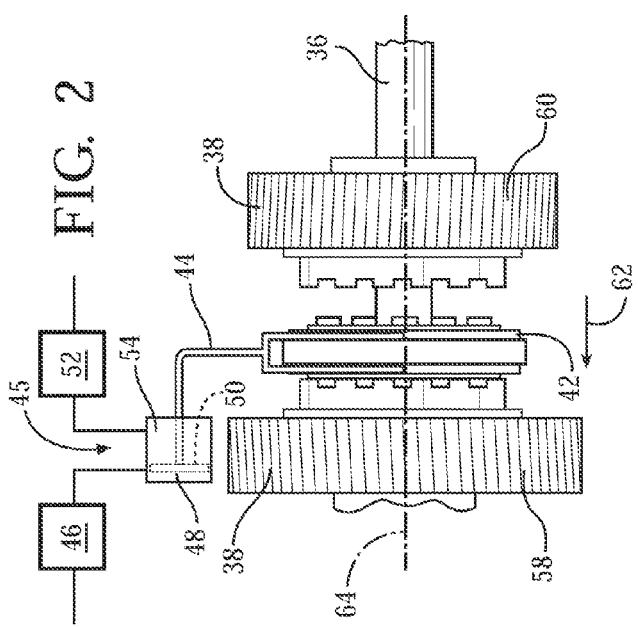
FIG. 3 is an enlarged fragmentary schematic plan view of the dry dual clutch transmission showing the synchronizer actuator fork in a second engaged position for coupling a second gear to the layshaft.

Referring to FIGS. 2 and 3, a fragmentary portion of the dual clutch transmission 20 shows a first layshaft gear 58 and a second layshaft gear 60 of the dual clutch transmission 20, rotatably supported by the second layshaft 36. A synchronizer 42 is moveable along the second layshaft 36 into interlocking engagement with both the first layshaft gear 58 and the second layshaft gear 60. A synchronizer actuator fork 44 is operable to move the synchronizer 42 in a first direction 62 along a longitudinal axis 64 of the second layshaft 36 into interlocking engagement with the first layshaft gear 58 to rotatably couple the first layshaft gear 58 and the second layshaft 36. The synchronizer actuator fork 44 is also operable to move the synchronizer 42 in a second direction 66 along the longitudinal axis 64 of the second layshaft 36, opposite the first direction 62, into interlocking engagement with the second layshaft gear 60 to rotatably couple the second layshaft gear 60 to the second layshaft 36. While the method described below is described in terms of the specific components shown in FIGS. 2 and 3, it should be appreciated that the method is applicable to all of the synchronizer actuator forks 44 of the dual clutch transmission 20. Furthermore, it should be appreciated that the method described below may be employed to learn the neutral position and the engaged positions of two of the synchronizer actuator forks 44 simultaneously. For example, the method may be employed to learn the positions of synchronizer actuator fork 44A and synchronizer actuator fork 44B simultaneously, and upon completion, may then be employed to learn the positions of synchronizer actuator fork 44C and synchronizer actuator fork 44D simultaneously.

In order to move the synchronizer 42 into interlocking engagement with the first layshaft gear 58, a pressure force is applied to the actuator 45 of the synchronizer actuator fork 44. As noted above, the actuator 45 includes the actuator piston 50, which is controlled by the pressure solenoid 46 and the flow solenoid 52. By applying the fluid pressure force to the appropriate side of the actuator piston 50, the pressure force moves the synchronizer actuator fork 44 in the first direction 62 along the longitudinal axis 64 of the second layshaft 36, into interlocking engagement with the first layshaft gear 58, as shown in FIG. 2. Once the synchronizer 42 is positioned in interlocking engagement with the first layshaft gear 58, the pressure force that was applied to the actuator 45 of the synchronizer actuator fork 44 is released.

After the pressure force that was applied to the actuator 45 of the synchronizer actuator fork 44 has been released, and the pressure force applied to the actuator 45 drops to zero KPa, a first position of the synchronizer actuator fork 44 is sensed. The first position of the synchronizer actuator fork 44 may be sensed in any suitable manner, such as with a suitable sensor configured to sense the position of the synchronizer actuator fork 44.

The synchronizer 42 is then moved in the second direction 66 into interlocking engagement with the second layshaft gear 60. In order to move the synchronizer 42 into interlocking engagement with the second layshaft gear 60, a pressure force is applied to the actuator 45 of the synchronizer actuator fork 44. As noted above, the actuator 45 includes the actuator piston 50, which is controlled by the pressure solenoid 46 and the flow solenoid 52. By applying the fluid pressure force to the appropriate side of the actuator piston 50, the pressure force moves the synchronizer actuator fork 44 in the second direction 66 along the longitudinal axis 64 of the first layshaft 34, into interlocking engagement with the second layshaft gear 60, as shown in FIG. 3. Once the synchronizer 42 is positioned in interlocking engagement with the second layshaft gear 60, the pressure force that was applied to the actuator 45 of the synchronizer actuator fork 44 is released.

After the pressure force that was applied to the actuator 45 of the synchronizer actuator fork 44 has been released, and the pressure force applied to the actuator 45 drops to zero KPa, a second position of the synchronizer actuator fork 44 is sensed. The second position of the synchronizer actuator fork 44 may be sensed in any suitable manner, such as with a suitable sensor configured to sense the position of the synchronizer actuator fork 44.

The synchronizer actuator fork 44 may repeatedly move in a cyclical manner between the first direction 62 to move the synchronizer 42 into interlocking engagement with the first layshaft gear 58, and the second direction 66 to move the synchronizer 42 into interlocking engagement with the second layshaft gear 60. This process, including moving the synchronizer 42 into interlocking engagement with the first layshaft gear 58, sensing the first position of the synchronizer actuator fork 44, moving the synchronizer 42 into interlocking engagement with the second layshaft gear 60, and sensing the second position of the synchronizer actuator fork 44, may be repeated a pre-determined number of occurrences, with each occurrence sensing and registering in the memory of the control module 56 a different value for the first position and the second position. Accordingly, for each occurrence of this repeated test cycle, one first position and one second position of the synchronizer actuator fork 44 is sensed and saved in the memory of the control module 56.

The sensed first positions of the synchronizer actuator fork 44, that were sensed for each occurrence of the synchronizer actuator fork 44 moving the synchronizer 42 into the interlocking engagement with the first layshaft gear 58, are averaged together to define a first engaged position, which is then stored in the memory of the control module 56. Accordingly, all of the sensed first positions that were saved in the memory of the control module 56 are averaged together to define the first engaged position. The first engaged position is the position of the synchronizer actuator fork 44 used by the control module 56 to control the dual clutch transmission 20 for engaging the synchronizer 42 and the first layshaft gear 58 in interlocking engagement.

The sensed second positions of the synchronizer actuator fork 44, that were sensed for each occurrence of the synchronizer actuator fork 44 moving the synchronizer 42 into the interlocking engagement with the second layshaft gear 60, are averaged together to define a second engaged position, which is then stored in the memory of the control module 56. Accordingly, all of the sensed second positions that were saved in the memory of the control module 56 are averaged together to define the second engaged position. The second engaged position is the position of the synchronizer actuator fork 44 used by the control module 56 to control the dual clutch transmission 20 for engaging the synchronizer 42 and the second layshaft gear 60 in interlocking engagement.

Figure 4:
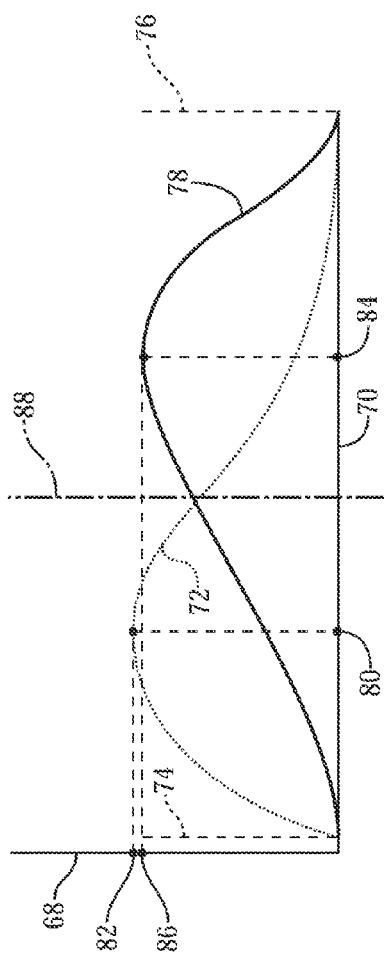
FIG. 4 is a graph showing the acceleration of the synchronizer actuator fork relative to the longitudinal axis of the layshaft when moving between the first engaged position and the second engaged position.

Referring also to FIG. 4, a neutral position 88 of the synchronizer actuator fork 44 may be determined simultaneously with the process described above for determining the first engaged position 74 and the second engaged position 76 of the synchronizer actuator fork 44. Within FIG. 4, the magnitude of the acceleration of the synchronizer actuator fork 44 is shown in a vertical axis 68, and the relative position of the synchronizer actuator fork 44 along the longitudinal axis 64 of the first layshaft 34 is shown along a horizontal axis 70. Reference line 72 represents the movement of the synchronizer actuator fork 44 from the first engaged position 74, i.e., from interlocking engagement with the first layshaft gear 58, into the second engaged position 76, i.e., into interlocking engagement with the second layshaft gear 60. Reference line 78 represents the movement of the synchronizer actuator fork 44 from the second engaged position 76, i.e., from interlocking engagement with the second layshaft gear 60, into the first engaged position 74, i.e., into interlocking engagement with the first layshaft gear 58.

In order to determine the neutral position 88 of the synchronizer actuator fork 44, an acceleration of the synchronizer actuator fork 44 in the first direction 62 is sensed as the synchronizer actuator fork 44 moves between the second engaged position 76 and the first engaged position 74. Referring to reference line 72, a first axial location 80 along the longitudinal axis 64 of the first layshaft 34, which correlates to a peak acceleration 82 of the synchronizer actuator fork 44 in the first direction 62, is identified. An acceleration of the synchronizer actuator fork 44 in the second direction 66 is sensed as the synchronizer actuator fork 44 moves between the first engaged position 74 and the second engaged position 76. Referring to reference line 78, a second axial location 84 along the longitudinal axis 64 of the first layshaft 34, which correlates to a peak acceleration 86 of the synchronizer actuator fork 44 in the second direction 66, is identified.

The first axial location 80 and the second axial location 84 that are identified for each occurrence of the test cycle are averaged to calculate a neutral position 88 of the synchronizer actuator fork 44, between the first engaged position 74 and the second engaged position 76. The neutral position 88 is the position of the synchronizer actuator fork 44 when the synchronizer 42 is neither engaged with the first layshaft gear 58 or the second layshaft gear 60.

For each occurrence in which the synchronizer 42 is moved into interlocking engagement with the first layshaft gear 58, and then into interlocking engagement with the second layshaft gear 60, a first axial location 80 and a second axial location 84 are identified, and may be saved in the memory of the control module 56. Similarly, for each occurrence of the test cycle, the neutral position 88 is calculated and saved in the memory of the control module 56. As noted above, the test cycle may include a pre-determined number of occurrences, with each occurrence of the repeated test cycle generating one first axial location 80 and one second axial location 84 that are identified and saved in the memory of the control module 56, and from which one neutral position 88 is calculated and saved in the memory of the control module 56.

This process of calculating a neutral position 88 for each occurrence of the test cycle, in which the synchronizer 42 is moved into interlocking engagement with the first layshaft gear 58, and then into interlocking engagement with the second layshaft gear 60, is repeated a pre-determined number of occurrences, with each occurrence generating one calculated neutral position value. All of the calculated neutral positions 88 of the synchronizer actuator fork 44, that were calculated for each occurrence of the synchronizer actuator fork 44 moving the synchronizer 42 into the interlocking engagement with the first layshaft gear 58 and then the second layshaft gear 60, are averaged together to define an average neutral position, which is then saved in the memory of the control module 56. Accordingly, all of the calculated neutral positions that were saved in the memory of the control module 56 are averaged together to define the average neutral position. The average neutral position is the position of the synchronizer actuator fork 44 used by the control module 56 to control the dual clutch transmission 20 for positioning the synchronizer 42 when neither first layshaft gear 58 nor the second layshaft gear 60 are to be coupled to the first layshaft 34.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a dual clutch transmission, the method comprising:
repeatedly moving a synchronizer into interlocking engagement with a first gear with a synchronizer actuator fork to rotatably couple the first gear to a layshaft;
repeatedly sensing a position of the synchronizer actuator fork for each occurrence that the synchronizer actuator fork moves the synchronizer into the interlocking engagement with the first gear;
averaging the sensed positions of the synchronizer actuator fork that were sensed for each occurrence of the synchronizer actuator fork moving the synchronizer into the interlocking engagement with the first gear to define a first engaged position of the synchronizer actuator fork for engaging the first gear; and
controlling the actuation of the dry dual clutch transmission based on the first engaged position of the synchronizer actuator fork.

2. A method as set forth in claim 1 wherein repeatedly moving the synchronizer into interlocking engagement with the first gear with the synchronizer actuator fork is further defined as moving the synchronizer into interlocking engagement with the first gear with the synchronizer actuator fork at least a pre-determined number of occurrences.

3. A method as set forth in claim 2 wherein repeatedly sensing the position of the synchronizer actuator fork for each occurrence that the synchronizer actuator fork moves the synchronizer into the interlocking engagement with the first gear is further defined as sensing the position of the synchronizer actuator fork for each occurrence that the synchronizer actuator fork moves the synchronizer into the interlocking engagement with the first gear at least a pre-determined number of occurrences.

4. A method as set forth in claim 1 wherein moving the synchronizer into interlocking engagement with the first gear with the synchronizer actuator fork includes applying a pressure force to an actuator of the synchronizer actuator fork to move the synchronizer into the interlocking engagement with the first gear, and then releasing the pressure force applied to the actuator of the synchronizer actuator fork.

5. A method as set forth in claim 4 wherein sensing the position of the synchronizer actuator fork for each occurrence that the synchronizer actuator fork moves the synchronizer into the interlocking engagement with the first gear is further defined as sensing the position of the synchronizer actuator fork when the pressure force applied to the actuator drops to zero KPa upon the pressure force applied to the actuator of the synchronizer actuator fork being released.

6. A method as set forth in claim 5 wherein the dry dual clutch transmission includes a second gear, with the synchronizer actuator fork operable to move the synchronizer into interlocking engagement with the second gear to rotatably couple the second gear to the layshaft, wherein the synchronizer actuator fork moves in a first direction to move the synchronizer into interlocking engagement with the first gear, and wherein the synchronizer actuator fork moves in a second direction, opposite the first direction, to move the synchronizer into interlocking engagement with the second gear.

7. A method as set forth in claim 6 further comprising:
repeatedly moving the synchronizer into interlocking engagement with the second gear with the synchronizer actuator fork to rotatably couple the second gear to the layshaft;
repeatedly sensing a position of the synchronizer actuator fork for each occurrence that the synchronizer actuator fork moves the synchronizer into the interlocking engagement with the second gear;
averaging the sensed positions of the synchronizer actuator fork that were sensed for each occurrence of the synchronizer actuator fork moving the synchronizer into the interlocking engagement with the second gear to define a second engaged position of the synchronizer actuator fork for engaging the second gear; and controlling the actuation of the dry dual clutch transmission based on the second engaged position of the synchronizer actuator fork.

8. A method as set forth in claim 7 wherein moving the synchronizer into interlocking engagement with the second gear with the synchronizer actuator fork includes applying a pressure force to the actuator of the synchronizer actuator fork to move the synchronizer into the interlocking engagement with the second gear, and then releasing the pressure force applied to the actuator of the synchronizer actuator fork.

9. A method as set forth in claim 8 wherein sensing the position of the synchronizer actuator fork for each occurrence that the synchronizer actuator fork moves the synchronizer into the interlocking engagement with the second gear is further defined as sensing the position of the synchronizer actuator fork when the pressure force applied to the actuator drops to zero KPa upon the pressure force applied to the actuator of the synchronizer actuator fork being released.

10. A method as set forth in claim 9 wherein the synchronizer actuator fork repeatedly moves in a cyclical manner between the first direction to move the synchronizer into interlocking engagement with the first gear, and the second direction to move the synchronizer into interlocking engagement with the second gear.

11. A method as set forth in claim 10 further comprising sensing an acceleration of the synchronizer actuator fork in the first direction as the synchronizer actuator fork moves between the second engaged position and the first engaged position.

12. A method as set forth in claim 11 further comprising identifying a first axial location along the longitudinal axis of the layshaft of a peak acceleration of the synchronizer actuator fork in the first direction.

13. A method as set forth in claim 12 further comprising sensing an acceleration of the synchronizer actuator fork in the second direction as the synchronizer actuator fork moves between the first engaged position and the second engaged position.

14. A method as set forth in claim 13 further comprising identifying a second axial location along the longitudinal axis of the layshaft of a peak acceleration of the synchronizer actuator fork in the second direction.

15. A method as set forth in claim 14 further comprising averaging the first axial location and the second axial location to calculate a neutral position of the synchronizer actuator fork between the first engaged position and the second engaged position.

16. A method as set forth in claim 15 further comprising repeatedly calculating the neutral position of the synchronizer actuator fork for each cyclic movement of the synchronizer actuator fork between the first engaged position and the second engaged position, and averaging each calculated neutral position to define an average neutral position of the synchronizer actuator fork.

17. A method as set forth in claim 1 further comprising providing a control module coupled to the dry dual clutch transmission and operable to control the movement of the synchronizer actuator fork, sense the position of the synchronizer actuator fork, and sense the acceleration of the synchronizer actuator fork.

18. A method of learning neutral and engaged positions of a synchronizer actuator fork that is operable to move a synchronizer into interlocking engagement with either a first gear and a layshaft or a second gear and the layshaft, the method comprising:

applying a pressure force to an actuator of the synchronizer actuator fork to move the synchronizer actuator fork in a first direction along a longitudinal axis of the layshaft to move the synchronizer into interlocking engagement with the first gear to rotatably couple the first gear and the layshaft;

releasing the pressure force applied to the actuator after the synchronizer actuator fork has moved the synchronizer into interlocking engagement with the first gear;

sensing a first location of the synchronizer actuator fork along the longitudinal axis of the layshaft after the pressure force applied to the actuator to move the synchronizer actuator fork into interlocking engagement with the first gear has been released and dropped to zero KPa;

defining the sensed first location of the synchronizer actuator fork as a first engaged position of the synchronizer actuator fork;

applying a pressure force to the actuator of the synchronizer actuator fork to move the synchronizer actuator fork in a second direction along a longitudinal axis of the layshaft, opposite the first direction, to move the synchronizer into interlocking engagement with the second gear to rotatably couple the second gear and the layshaft;

releasing the pressure force applied to the actuator after the synchronizer actuator fork has moved the synchronizer into interlocking engagement with the second gear;

sensing a second location of the synchronizer actuator fork along the longitudinal axis of the layshaft after the pressure force applied to the actuator to move the synchronizer actuator fork into interlocking engagement with the second gear has been released and dropped to zero KPa; and defining the sensed second location of the synchronizer actuator fork as a second engaged position of the synchronizer actuator fork.

19. A method as set forth in claim 18 further comprising:

sensing an acceleration of the synchronizer actuator fork in the first direction as the synchronizer actuator fork moves between the second engaged position and the first engaged position;

identifying a first axial location along the longitudinal axis of the layshaft of a peak acceleration of the synchronizer actuator fork in the first direction;

sensing an acceleration of the synchronizer actuator fork in the second direction as the synchronizer actuator fork moves between the first engaged position and the second engaged position;

identifying a second axial location along the longitudinal axis of the layshaft of a peak acceleration of the synchronizer actuator fork in the second direction; and averaging the first axial location and the second axial location to calculate a neutral position of the synchronizer actuator fork between the first engaged position and the second engaged position.

20. A method as set forth in claim 19 wherein the synchronizer actuator fork repeatedly moves in a cyclical manner between the first direction to move the synchronizer into interlocking engagement with the first gear, and the second direction to move the synchronizer into interlocking engagement with the second gear, and wherein the first engagement position is repeatedly defined and a running average calculated to define an average first engagement position, the second engagement position is repeatedly defined and a running average calculated to define an average second engagement position, and the neutral position is repeatedly defined and a running average calculated to define an average neutral position.

* * * * *